United States Patent
Bruemmer et al.

(10) Patent No.: US 7,002,464 B2
(45) Date of Patent: Feb. 21, 2006

(54) RELATIVE TIMING MECHANISM FOR EVENT SEQUENCING WITHOUT CLOCK SYNCHRONIZATION

(75) Inventors: Tim Bruemmer, Carmel, IN (US); Rich McGillicuddy, Carmel, IN (US); Ryan Nicoletti, West Lafayette, IN (US)

(73) Assignee: Home Data Source, Inc., Carmel, IN (US)

(*) Notice: Subject to any disclaimer, the term of this patent is extended or adjusted under 35 U.S.C. 154(b) by 130 days.

(21) Appl. No.: 10/804,956

(22) Filed: Mar. 19, 2004

(65) Prior Publication Data

US 2004/0257242 A1 Dec. 23, 2004

Related U.S. Application Data

(60) Provisional application No. 60/455,823, filed on Mar. 19, 2003.

(51) Int. Cl.
*G08B 1/00* (2006.01)
*G08B 1/08* (2006.01)
*G08B 23/00* (2006.01)
*G08B 25/00* (2006.01)

(52) U.S. Cl. ............... 340/523; 340/524; 340/525; 340/526; 340/527; 340/528; 340/529; 340/539.1; 340/309.16; 340/870.14

(58) Field of Classification Search ......... 340/309.16, 340/539.1, 523–529, 870.14
See application file for complete search history.

(56) References Cited

U.S. PATENT DOCUMENTS

| 3,984,815 A | * | 10/1976 | Drexler et al. ............... 377/20 |
| 4,473,889 A | * | 9/1984 | Ross .......................... 709/248 |
| 6,617,969 B1 | * | 9/2003 | Tu et al. ...................... 340/517 |

* cited by examiner

*Primary Examiner*—Jeffery Hofsass
*Assistant Examiner*—Lam Pham
(74) *Attorney, Agent, or Firm*—Ice Miller

(57) ABSTRACT

A remote sensing system operable to collect sensor timing data comprising a central data hub for detecting the occurrence of an event and processing information about the detected event, the remote sensing system comprising a central data hub, at least one sensor having a simple clock operable to sense an event and transmit data to central data hub. By way of calculating the data transmitted by the at least one sensor, the central data hub can determine the time at which each event occurred and place a plurality of sensed events in sequence.

21 Claims, 3 Drawing Sheets

RELATIVE TIMING MECHANISM FOR EVENT SEQUENCING WITHOUT CLOCK SYNCHRONIZATION

CROSS-REFERENCE TO RELATED APPLICATIONS

This application claims the benefit of U.S. provisional application No. 60/455,823, filed Mar. 19, 2003.

BACKGROUND

This invention relates to the field of timing methods and in particular, timing synchronization methods.

Timing synchronization issues affect a variety of fields from network communications to manufacturing. In particular, technological applications using multiple electronic devices require some method of synchronizing those devices in order to ensure their proper function. Such systems with multiple devices present difficulties when working with time readings due to the potential for each device's clock to be set to a different time and have differing drift rates. The traditional solution to these problems entail invoking one of many clock synchronization protocols, in which each device participates in an information exchange with the others resulting in each device's clock being set to the same time. In particular, present timing mechanisms for relating time readings from many devices with different clocks require each of the devices to interactively participate in a clock synchronization protocol. Each of the devices is required at some point in the protocol to reset their clocks in response to some received instruction or calculation. As described below, it would be advantageous in many situations to provide a means for obtaining sufficient timing information in a remote sensing application while avoiding clock synchronization entirely.

In remote sensing applications where a large number of sensors will be deployed, cost considerations provide motivation to ensure that each sensor is as simple as possible. Each component of a sensor which can be rendered unnecessary through proper design may represent relatively little cost reduction on a per sensor basis, but significant savings may be realized when this is applied to all the sensors at large. In addition, for sensors without an external power supply, this simplification may improve battery life as well.

For remote sensing applications where communications between the sensors and the central data collection mechanism occur wirelessly, one way to simplify sensors is to eliminate the need for them to receive messages. If the messaging protocol allows the sensors to transmit their data without responding to messages from the central hub, then the cost and power consumption of including a receiver in the hardware can be avoided.

The receiver-free remote sensor design suggested in the preceding paragraph presents two hurdles to implementation. First, if the sensors are only capable of one-way communication, then the central hub has no means for requesting a message to be resent if it is missed due to interference or a collision of transmissions by multiple sensors. Requiring the sensors repeat each of their messages reduces the likelihood of this possibility, but introduces the second hurdle, i.e., the possibility that messages are sequenced incorrectly unless the sensor's clocks are synchronized. However, note that utilizing a traditional clock synchronization algorithm would require the sensors to be able to reset their clocks in response to some instruction or calculation that occurs at some point in the protocol, precluding the elimination of the receiver from the sensor hardware. Accordingly, it would be desirable to provide a system that allows sensors in a remote sensing application the ability to perform the desired message repetition while providing the central data collection hub with the timing information necessary for the hub to reconstruct the correct sequence of messages without necessitating clock synchronization.

SUMMARY

A remote sensing system is comprised of a plurality of sensors and a central data collection hub. When a sensor is stimulated, it transmits a message including information identifying the detected event and any time delay since the occurrence of the detected event, a data collection hub including a receiver and a hub clock operable to receive the message transmitted from the at least one sensor and calculate a time of occurrence for the detected event based upon the time the data collection hub received the message and the time delay included in the message from the at least one sensor. When each event is time-stamped in this fashion relative to the same central clock, a correct sequencing of the events is achieved. Not only does this calculation produce a relative timestamp for each event that allows these events to be sequenced, but the relative timestamps themselves allow a further calculation of the absolute time between each event, notwithstanding drift in the central clock and the miniscule difference in message propagation time due to difference in the distance from each sensor to the central hub. This additional information could also be very valuable to applications implementing this protocol.

Another embodiment of the present invention relates to a method for collecting sensor timing data comprising sensing an event using at least one sensor; transmitting at least one message identifying the event and the time elapsed since the event; receiving the at least one message at a central data collection hub; and calculating a time for a sensed event by subtracting the elapsed time identified in the at least one transmitted message from the time the at least one message was received at the central data collection hub. According to this embodiment, the method could additionally comprise transmitting a plurality of identifying messages containing an identifying header and the time elapsed between the detected event and transmission of the given message. Further, this embodiment could comprise the additional step of sequencing an event relative to other sensed events based upon the time calculated for the event. Further, this embodiment could comprise the additional step of determining whether a transmission identifies an event for which an earlier transmission has been received by the central hub. Then, if the transmission is determined to identify an event for which an earlier transmission has been received, the transmission could be deleted. However, if the transmission identifies an event for which an earlier transmission was not received, the transmitted data could be saved.

A final embodiment of the present invention is a method for collecting sensor timing data comprising providing a central data collection hub, providing at least one sensor having a transmitter, stimulating the at least one sensor, transmitting at least one message containing information about the time elapsed between stimulation of the sensor and transmission of the message; receiving the at least one message by the central data collection hub; and calculating the time of stimulation of the at least one sensor by subtracting the time elapsed between stimulation from a time provided by the clock. Further, multiple stimulations from at least one sensor could be sequenced according to the time calculated for each stimulation.

DESCRIPTION

Figure 1:
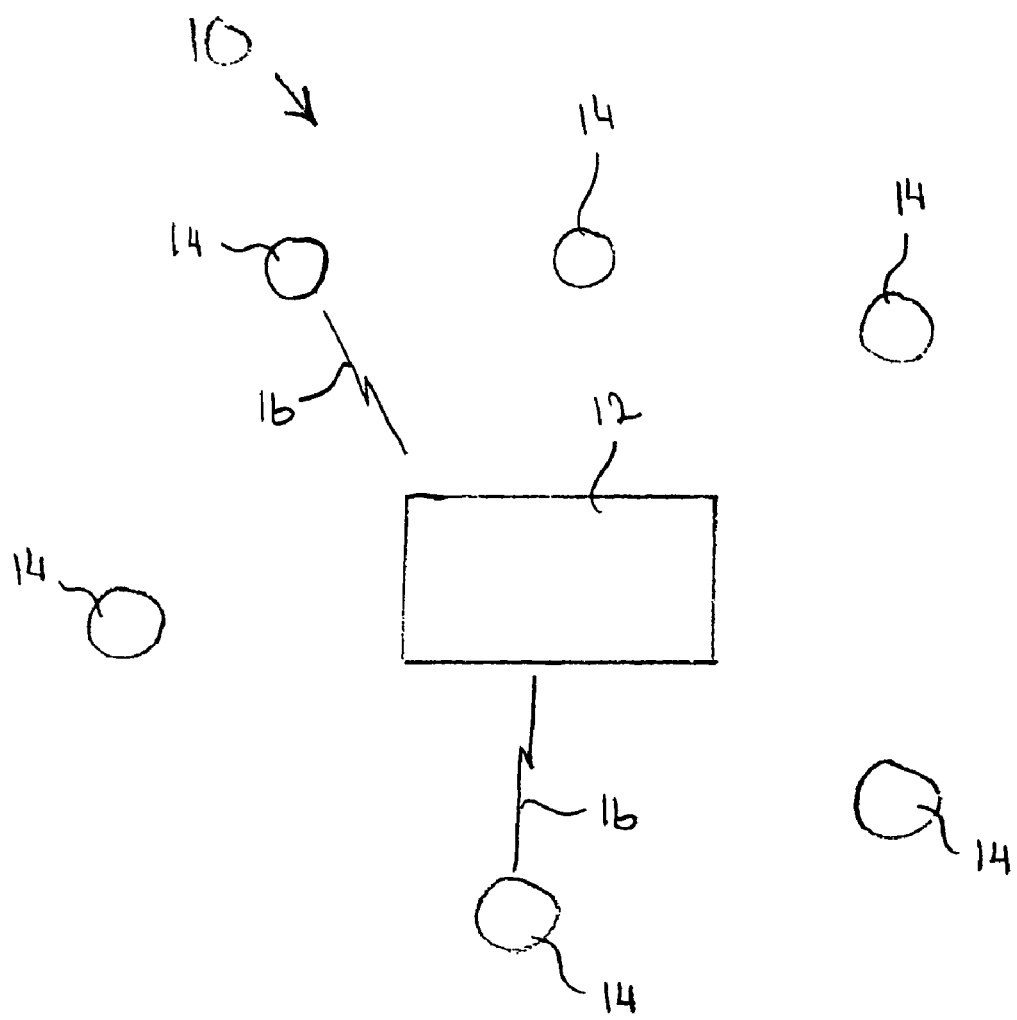
FIG. 1 is a schematic diagram of a central hub and a plurality of sensors.

The remote sensing system 10 is comprised of a plurality of sensors 14 and a central data collection hub 12. Each sensor 14 includes a wireless transmitter and a simple clock. The central data collection hub 12 includes a wireless receiver and a real-time clock. The central data collection hub 12 also includes a microprocessor and a memory for storing data. The wireless transmitter included with each sensor 14 enables the sensor to communicate the data describing events detected by the sensor to the wireless receiver of the central hub 12. Transmission lines 16 shown in FIG. 1 are representative of the wireless communication from the sensors 14 to the central data hub 12. The clocks included on each of the sensors 14 and the central data hub 12 allow the messages to be properly sequenced according to the protocol described herein.

When a sensor 14 is stimulated, it immediately creates a timestamp denoting the time of the detected event in memory. Before transmitting a datagram (message) relating to the event to the central hub, the sensor creates a header for the datagram indicating, in addition to other information, an ID for the sensor sending the message. Because the sensors are only equipped with transmitters (and not receivers), they cannot communicate with each other to avoid collisions, and the central hub cannot inform the sensors when a message is lost and request retransmission. Thus, when a sensor informs the hub of a sensor fire, it sends several repeated messages in order to overcome the possible loss due to interference and collisions.

When a sensor sends repeated messages, the central hub 12 is likely to receive one or more of the original or repeated messages. However, if the central hub were to sequence received messages from the sensors by time received, the order of the messages could potentially be scrambled since all of the messages sent by the sensors 14 are not received by the central hub 12. Therefore, when a message is sent, the message also includes timing information to help the central hub sequence events related to messages received. In particular, when a message is sent by a sensor to indicate that an event has occurred, the message also includes data about the amount of time that has elapsed since the event occurred. The value of this additional information is illustrated in the example below.

Figure 2:
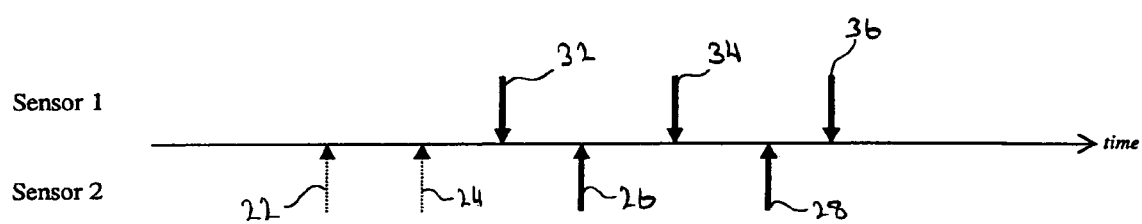
FIG. 2 is a diagram representing sensor fires sequenced at a central hub.

FIG. 2 is a diagram representative of a series of messages sent from two different sensors to the data collection hub. Each series of messages is related to one event detected by the respective sensor. The dashed arrows 22 and 24 represent messages which were sent from the sensors, but missed by the data collection hub. The solid arrows 26–36 represent messages that were sent from the sensors and received by the data collection hub. If the data collection hub simply sequenced these messages 26–36 based on the order in which it received them, then the event denoted by the message 32 from sensor 1 would be recorded as having occurred first, even though that event actually occurred after the event indicated by message 26 from sensor 2. In particular, because messages 22 and 24 are lost, the central hub would not have recorded the sequence of events in the proper order.

Timing information obviously needs to be relayed with the messages to the central hub if this method of message repetition is going to be used to avoid data loss. A sensor could affix the timestamp saved to memory indicating the instant it was originally stimulated in an effort to provide this timing information. However, the message sequencing is then left to the mercy of the synchronization of the clocks on the sensors. For instance, if the delay between the two events for sensor 1 and sensor 2 was two seconds and the clock on sensor 2 was set five seconds later than the clock on sensor 1, the central hub would still conclude that the event indicated by sensor 1 occurred first.

Rather than send each message with the timestamp itself, the messages are instead affixed with the time which has elapsed since the original timestamp of the event, as mentioned above. Therefore, when the central hub receives these messages, it timestamps the receipt of the message and recalculates the projected time of the event relative to its own clock using the delay for that individual message. Thus, regardless of whether or not the first, last, or any interposing message is the only one received to represent an event, the time of origination of that event can be placed at the proper point in the timeline of the sensor fire stream. In the case of the example shown in FIG. 2, when the first message 32 from sensor #1 is received, its delay time will be zero, since it is the first message representing that event to be fired. One second later, the third message 26 sent from sensor #2 is the first message finally received by the central hub from sensor #2. This message 26 has a delay time of three seconds. The microprocessor of the central hub is used to subtract that time from the time of arrival of the third message 26, discovering that the event relayed from sensor #2 actually happened two seconds earlier than the event relayed from sensor #1. Therefore, as long as the clock included with each sensor is able to determine with reasonable accuracy the period of time between the detection of an event and the time when a repeated message is sent, the data provided to the central hub should be sufficient to allow the central hub to reconstruct a sequence of events with reasonable accuracy. In addition to reconstructing the sequence of events, the hub is also operable to reconstruct the timing between the events. Thus, in the above example, the hub would not only have the ability to determine that sensor #2 fired before sensor #1, but would also have the ability to determine that sensor #2 fired two seconds before sensor #1. This ability to reconstruct event timing is possible since the messages transmitted from the sensors to the hub include delay time information from the actual occurrence of the event.

While the method provides no assurance that the clock on the central hub is synchronized to universal time, it does allow all of the events to be aligned in the same relative timeframe (that of the central hub) with respect to their original sensor fire time. Should the necessity arise to align these events with universal time, the difference between a simultaneous reading from the hub and a clock synchronized with universal time may be used to adjust all of the readings to align them with universal time as well. If this process is performed on a regular basis with a high enough frequency (e.g., daily), the drift during each of the intervals between synchronizations should be small enough to remain a minimal error.

Figure 3:
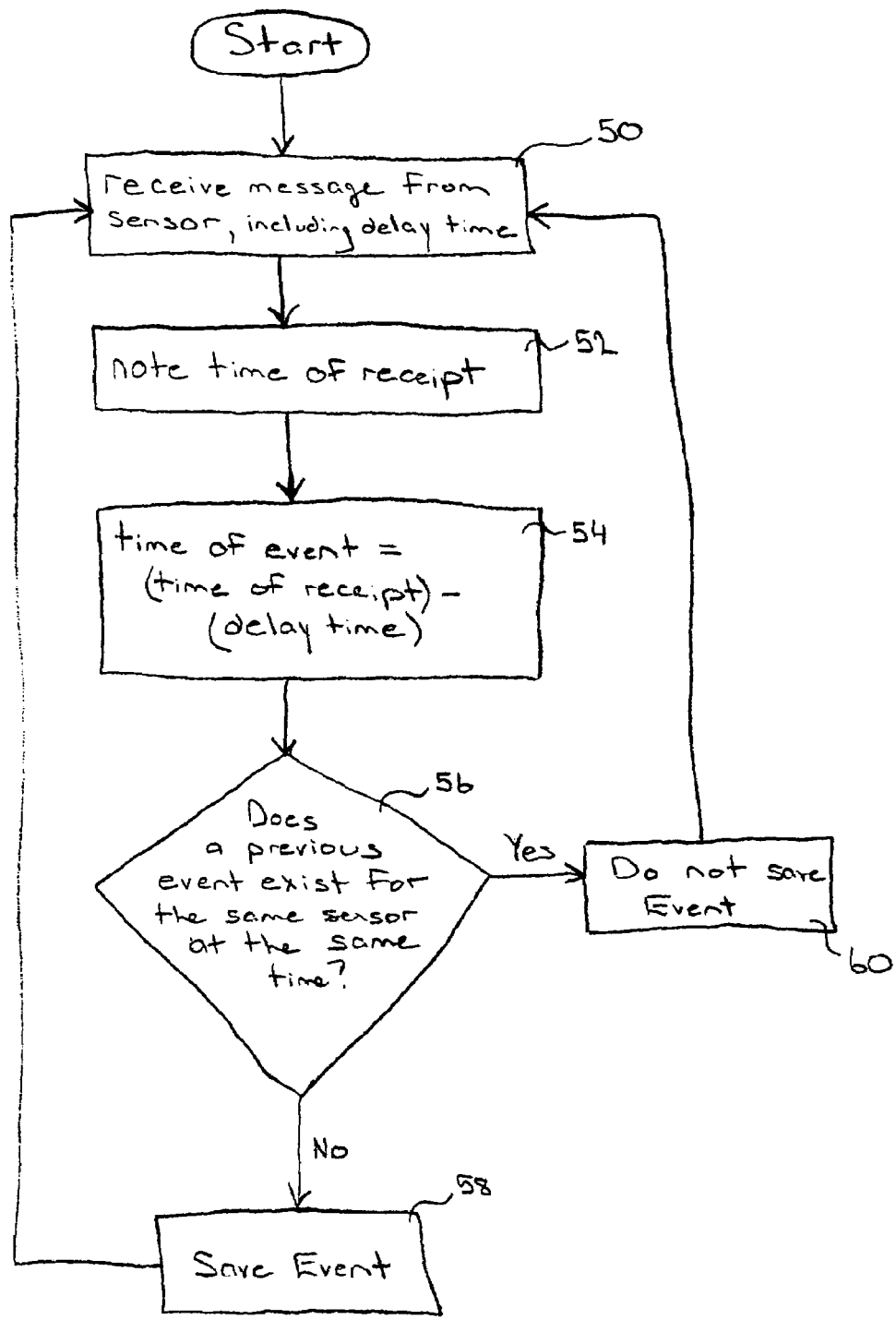
FIG. 3 is a flow chart of the steps taken by the central hub to determine the time of an event.

FIG. 3 shows a flow-chart of the steps taken by the microprocessor of the central hub to determine the time of an event detected by a particular sensor. As shown in FIG. 3, in step 50 the central hub receives a message from one of the sensors. That received message will include a delay time. In step 52, the microprocessor notes the time of receipt of the message at the central hub. The microprocessor then determines the time of the event described in the message from the sensor as the time of receipt of the message minus the delay time included in the message. In step 56, the microprocessor then determines if a previous event exists for this same time from the same sensor. If a previous event does not exist, the event is saved by the central hub, as noted in step 58. On the other hand, if a previous event does exist for the same time from the same sensor, the central hub has already saved the event from a previous message and the event is not saved again, as noted in step 60. Using these steps, the central hub is able to provide a timeline of sequenced events without the need for synchronization of clocks between the central hub and the sensors that provide messages to the central hub.

One exemplary application of the present invention is use in residential monitoring, such as remote monitoring of the elderly for purposes of health and safety. In such an application, the remote sensors could embody a first and a second sensor positioned in a hallway, each sensor operable to detect the passage of a human past the sensor as he or she moves down the hallway. As explained above, even if the hub receives the messages in an incorrect order, the hub is operable to reconstruct the actual sequence of the events that triggered the sensor fires as well as the timing between the events. Therefore, in this example, the hub can determine not only the direction of travel down the hallway by determining which sensor fired first, but also the time of travel between the two sensors. This information could be important in determining the status and health of the individual being monitored (e.g., slow travel time might indicate a problem).

Although the present invention has been described in considerable detail with reference to certain preferred versions thereof, other versions are possible. For example, although the embodiment of the central hub explained herein included a microprocessor and a memory, the central hub need not include these items, and the central hub could simply pass on received data to a remote processor for processing the data and determining the sequence of events. Therefore, the spirit and scope of the appended claims should not be limited to the description of the preferred versions contained herein.

What is claimed is:

1. A remote sensing system for detecting the occurrence of an event and processing information about the detected event, the remote sensing system comprising:
   a. at least one remote sensor including a transmitter and a sensor clock, the at least one sensor operable to transmit a message including information related to (i) the existence of a detected event and (ii) any time delay since the occurrence of the detected event;
   b. a data collection hub including a receiver and a hub clock, the data collection hub operable to receive the message transmitted from the at least one sensor and calculate a time of occurrence for the detected event based upon (i) the time the data collection hub received the message transmitted from the at least one sensor and (ii) the time delay included in the message from the at least one sensor.

2. The remote sensing system of claim 1 wherein the data collection hub is further operable to subtract the time delay from the time the data collection hub received the message.

3. The remote sensing system of claim 2 wherein the data collection hub further comprises a microprocessor for calculating the time of occurrence of the detected event.

4. The remote sensing system of claim 2 wherein the data collection hub further comprises a memory for storing data including the detected event and the calculated time of occurrence for the detected event.

5. The remote sensing system of claim 4 wherein the memory is operable to note the time of receipt of the message transmitted from the at least one transmitter.

6. The remote sensing system of claim 4 wherein the data collection hub is further operable to determine whether the message transmitted from the at least one sensor includes information about a detected event that is the same event as a previously detected event.

7. The remote sensing system of claim 1 wherein the transmitter is a wireless transmitter.

8. The remote sensing system of claim 1 wherein the receiver is a wireless receiver.

9. The remote sensing system of claim 1 wherein the at least one sensor comprises a plurality of sensors, and each of the plurality of sensors is operable to transmit information related to a detected event to the data collection hub.

10. The remote sensing system of claim 9 wherein the data collection hub is further operable to sequence each detected event from each of the plurality of sensors.

11. A method for collecting sensor timing data comprising:
    a. sensing an event using at least one sensor;
    b. transmitting at least one message identifying the event and the time elapsed since the event;
    c. receiving said at least one message at a central data collection hub; and
    d. calculating a time for a sensed event by subtracting the elapsed time identified in the at least one transmitted message from the time the at least one message was received at the central data collection hub.

12. The method of claim 11 wherein the transmitting of the at least one message involves transmitting a plurality of messages containing an identifying header and the time elapsed between the detected event and transmission of the given message.

13. The method of claim 11 wherein the method comprises the additional step of sequencing an event relative to other sensed events according to the time calculated.

14. The method of claim 11 wherein the method comprises the additional step of determining whether a transmission identifies an event for which an earlier transmission has been received by the central data hub.

15. The method of claim 14 wherein the method comprises the additional step of deleting a transmission if the transmission identifies an event for which an earlier transmission has been received by the central data hub.

16. A method for collecting sensor timing data comprising:
    a. providing a central data collection hub having a receiver, a microprocessor, a memory, and a clock;
    b. providing at least one sensor having a transmitter;
    c. stimulating the at least one sensor;

d. transmitting at least one message containing information about the time elapsed between stimulation of the at least one sensor and transmission of the at least one message;
e. receiving the at least one message by the central data hub; and
f. calculating the time of stimulation of the at least one sensor by subtracting the time elapsed between stimulation from a time provided by the clock.

17. The method of claim 16 additionally comprising the step of sequencing a plurality of stimulations according to the respective calculated time of a given stimulation.

18. The method of claim 16 further comprising the step of repeatedly transmitting a message containing an identifying header and the time elapsed between stimulation and a given transmission for a given number of iterations.

19. The method of claim 18 comprising the additional step of identifying whether the transmitted message identifies a stimulation for which an earlier transmission has been received.

20. The method of claim 19 further involving the step of saving the transmitted message if the transmitted message identifies a stimulation for which an earlier transmission has not been received, or deleting the transmitted message if the transmitted message identifies a stimulation for which an earlier identifying transmission has been received.

21. The method of claim 16 wherein providing at least one sensor having a transmitter includes providing at least one sensor having a wireless transmitter.

* * * * *